United States Patent
Venable et al.

(10) Patent No.: US 8,494,304 B2
(45) Date of Patent: Jul. 23, 2013

(54) PUNCHED HOLE DETECTION AND REMOVAL

(75) Inventors: Dennis L. Venable, Marion, NY (US); Zhigang Fan, Webster, NY (US); Lee C. Moore, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1648 days.

(21) Appl. No.: 11/801,958

(22) Filed: May 11, 2007

(65) Prior Publication Data

US 2008/0279474 A1 Nov. 13, 2008

(51) Int. Cl.
*G06K 9/00* (2006.01)
*G06K 9/40* (2006.01)

(52) U.S. Cl.
USPC ........... 382/275; 382/112; 356/3.26; 399/407

(58) Field of Classification Search
USPC . 382/256, 257, 275, 308, 112, 282; 358/3.26; 399/407
See application file for complete search history.

(56) References Cited

U.S. PATENT DOCUMENTS

| | | | |
|---|---|---|---|
| 5,318,173 A * | 6/1994 | Datari | 209/580 |
| 5,850,478 A * | 12/1998 | Suzuki et al. | 382/204 |
| 5,959,290 A | 9/1999 | Schweid et al. | |
| 6,166,394 A | 12/2000 | Rubscha | |
| 7,020,352 B2 * | 3/2006 | O'Callaghan et al. | 382/305 |
| 7,177,454 B2 * | 2/2007 | McLaren et al. | 382/128 |
| 7,282,687 B2 * | 10/2007 | Matsuda et al. | 250/208.1 |
| 2003/0072487 A1 | 4/2003 | Fan et al. | |
| 2005/0013486 A1 * | 1/2005 | Wiedemann et al. | 382/181 |
| 2006/0219869 A1 * | 10/2006 | Sasaki | 250/208.1 |
| 2007/0003157 A1 | 1/2007 | Eschbach et al. | |

OTHER PUBLICATIONS

John C. Russ, "The Image Processing Handbook", $2^{nd}$ edition, 1995, 416-419.*

* cited by examiner

*Primary Examiner* — Aaron W Carter
(74) *Attorney, Agent, or Firm* — Fay Sharpe LLP

(57) ABSTRACT

A method for removal of punched hole artifacts in digital images includes, for a scanned document page, deriving an original digital image that defines the page in terms of a plurality of input pixels. A reduced resolution bitonal image is generated from the original image. The method further includes providing for identifying of candidate punched hole artifacts in the reduced resolution bitonal image and providing for testing the candidate punched hole artifacts for at least one of shape, size, and location. Where a candidate punched hole artifact meets the at least one test, the method includes generating a modified image. This includes erasing the candidate punched hole artifact from the original digital image.

21 Claims, 5 Drawing Sheets

PUNCHED HOLE DETECTION AND REMOVAL

BACKGROUND

In images derived by scanning documents with punched holes on a scanning device with a black platen cover, the punched holes on the copy pages typically appear as black holes. For a small scan job, these artifacts can be removed in a manual digital image enhancement operation on a pixel-by-pixel basis using widely available image processing software having an "erase" feature. Such a manual pixel-by-pixel based artifact removal method is generally not feasible in terms of time and cost for large, multi-page scan jobs commonly encountered in commercial, legal, academic, and other real-world environments.

Automated methods have been proposed for removal of artifacts in copies, such as punch holes, streaks, and blotches. In these techniques, the artifacts are identified using known image processing techniques and are automatically deleted from the scanned image data, with appropriate adjustment of the pixel values to blend in with the surrounding pixels as needed. However, such techniques have not been found satisfactory in terms of quality assurance and thus if implemented, may be still fairly operator intensive to avoid erroneous removal of original image information.

For production volume scanning operations, such as those for scanning and processing millions of document pages each day, it is common for many documents that are being processed to be originally bound in binders. There remains a need for an efficient method for removing the artifacts resulting from punched holes which can be performed without the need for operator input.

INCORPORATION BY REFERENCE

The following references, the disclosures of which are incorporated herein in their entireties by reference, are mentioned:

U.S. Pub. No. 20070003157, published Jan. 4, 2007, entitled ARTIFACT REMOVAL AND QUALITY ASSURANCE SYSTEM AND METHOD FOR SCANNED IMAGES, by Reiner Eschbach; et al., discloses an artifact removal and quality assurance method and system for digital images. A document comprising at least one printed page is scanned or the original image data are otherwise input. The input digital image data are segmented into components as to content type. The components are classified as either information or noise components. An information component image defined by the information components and a noise component image defined by the noise components are generated and displayed to the user. The user inputs quality assurance input data to indicate zero or more improperly classified components and any improperly classified component is reclassified. The component images are then regenerated and displayed to account for the reclassified component(s). The reclassified component is moved as a unit in real time as viewed by the user from an original location in one of the component images to a corresponding location in the other of the component images. Both component images are saved or otherwise output as desired.

U.S. Pat. No. 5,959,290, issued Sep. 28, 1999, entitled IMAGE INPUT DEVICE AND METHOD FOR PROVIDING SCANNING ARTIFACT DETECTION, by Schweid, et al. discloses a system and method which enables the location and orientation of an image to be determined without introducing scanning artifacts into the rendered image. The system utilizes a separate set of sensors on a scanning bar that are sensitive to a wavelength of light outside the range of wavelengths of the typical sensors found on the scanning bar, such as red, green, or blue. Moreover, the system includes a light source which is capable of emitting the wavelength of light that is outside this range of wavelength of light. Thus, whenever the additional set of sensors detects light, the system is able to determine that the light is due to a scanning artifact, such as a hole, rip, or dog ear in the original document being scanned.

U.S. Pat. No. 6,166,394 issued Dec. 26, 2000, entitled DUAL BACKGROUND DOCUMENT SCANNER TO ELIMINATE HOLE PRINTOUTS, by Rubscha, discloses a dual mode document aperture imaging prevention system and document edge location system, using the same digital document imager, for imaging different sizes of moving document sheets, some of which may have punched notebook or binder holes or other apertures. Both a black or substantially light absorbing imaging background surface area and a white or substantially light reflective imaging background surface area are automatically selectably provided in the same document imaging station as document backing surfaces for the two respective functions.

BRIEF DESCRIPTION

In accordance with one aspect of the exemplary embodiment. a method for removal of punched hole artifacts in digital images is provided. For a scanned document page, an original digital image that defines the page in terms of a plurality of input pixels is derived. A reduced resolution bitonal image is generated from the original image. The method further includes providing for identifying of candidate punched hole artifacts in the reduced resolution bitonal image and providing for testing the candidate punched hole artifacts for at least one of shape, size, and location. Where a candidate punched hole artifact meets the at least one test, the method includes generating a modified image, including erasing the candidate punched hole artifact from the original digital image.

In accordance with another aspect, an image processing unit receives an input digital image and generates a bitonal reduced resolution image therefrom. The image processing unit is configured for identifying candidate punched hole artifacts in the bitonal reduced resolution image and for verifying whether an identified candidate punched hole artifact meets at least one test for a punched hole artifact. Where the candidate punched hole artifact meets the at least one test, the image processing unit is configured for automatically erasing the candidate punched hole artifact from the input digital image.

In accordance with another aspect, an automated method of removing punched hole artifacts from scanned digital images includes scanning a document page to generate image data, deriving an original digital image from the image data that defines the page in terms of a plurality of input pixels, filtering the image to remove objects smaller than punched hole artifacts, including generating a reduced resolution image from the original image and optionally performing a morphological opening, for objects remaining after the filtering, performing tests on the objects for identifying candidate punched hole artifacts, and automatically erasing objects determined to be candidate punched hole artifacts from the original digital image.

DETAILED DESCRIPTION

Aspects of the exemplary embodiment disclosed herein relate to a system and method for automated removal of punched hole artifacts in scanned documents.

In various aspects, the method includes generating a reduced resolution bi-tonal version of the image. To the bitonal version, a morphological open is applied to get rid of text and other small objects, find any remaining objects near the page border, and check their size and roundness. Objects which fall into a predetermined class based on one or more of size, shape, and location, are identified and removed from the original image. In other embodiments, the morphological open may be omitted by selecting a resolution at which the punched holes are no more than about 2×2 pixels in size.

Punched holes are typically about 0.5-0.7 cm (¼") in size, and are typically located within about 4 cm of the image border. In one aspect, the exemplary method applies an algorithm which identifies and erases circular objects that are about 0.5-0.7 cm in size and are near the edge of the scanned page.

As used herein, "Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the image forming device and may include text, graphics, pictures, and the like.

Figure 1:
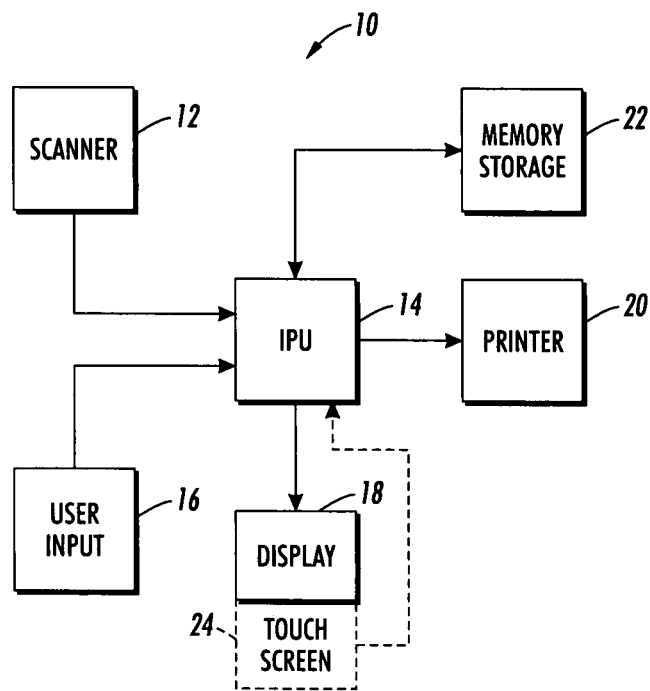
FIG. 1 is a functional block diagram of a digital image processing system in accordance with the exemplary embodiment and suitable for implementation of a method for removal of artifacts arising from punched holes from scanned images in accordance with the exemplary embodiment.

FIG. 1 illustrates a digital image processing apparatus 10 formed in accordance with the present embodiment. The image processing apparatus 10 can be embodied in a personal/office computing system or an image processing system such as a scanning/copying system, e.g., a digital copier or a multifunction (scan/print/fax/copy) digital image processing system or the like. More particularly, the image processing system 10 includes a scanner 12 for receiving one or more printed document pages as input and deriving digital data that represent the printed document page as output. The system 10 further includes an image processing unit (IPU) 14 for performing digital image processing operations in accordance with the exemplary method described with reference to FIG. 2. In particular, the IPU executes instructions for receiving input digital image data and processing the data to derive enhanced or otherwise altered digital image data as output in accordance with stored algorithms and/or based on user-selected functions. The system 10 may further include one or more user input devices 16, e.g., a mouse or other pointing device, a keyboard, stylus, etc., that is operatively connected to the IPU 14 and that allows a user to input data to the IPU 14 to control the image processing operations and all other functions of the system 10.

The system further comprises one or more output devices that are operatively connected to the IPU 14 including a visual display 18, a printer 20, and/or a memory 22. It should be noted that the visual display 18 can comprise a touch-screen input device 24 for user input to the IPU by using a finger or a stylus or the like to select an object displayed on the video screen of the visual display.

The IPU 14 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, memory 22 may reside at a single physical location, comprising one or more types of data storage, or be distributed across a plurality of physical systems in various forms. Memory 22 may store instructions executed by the IPU and/or images in the course of processing.

The printer 20 can comprise any device for rendering images on print media using colorants, such as inks or toners. Exemplary printers include xerographic printers, inkjet printers, and the like.

In the most general terms, a page of a document having one or more printed pages is processed by the scanner 12 to derive digital image data that represent the printed page in terms of a plurality of pixels arranged in rows and columns. The digital image data are input from the scanner to the IPU 14 and are output from the IPU, in original or processed form based upon stored image processing algorithms, image processing circuitry, and/or user input from the input device(s) 16,24, to one or more of the output devices such as the visual display 18 for viewing, the printer 20 for generation of a new printed document and/or the memory 22 for saving the data. In one embodiment, the system 10 is provided by a personal computer system programmed to perform digital image processing operations. In another embodiment, the system 10 is a dedicated digital image processing system hosted by as an image printing/reproduction system or the like. The scanner 12 can be replaced by another device such as storage device, camera or the like that supplies input image data to the image processing unit.

In the exemplary embodiment, the scanner 12 may include a document feeder which feeds pages of a document to a platen on which the pages to be scanned are positioned and a source of illumination, such as a row of light emitting diodes or the like, which illuminates the document pages. Reflected light is collected by a lens arrangement and recorded by a photosensitive device, which may include one or more linear arrays of photosensors. A suitable processing device generates an image comprising signals representative of reflected light recorded by the photosensitive device. The document page being scanned is maintained in close alignment with the platen by a platen cover, which may be black in color. Accordingly, artifacts, in the form of generally circular black holes, corresponding to holes punched in the document, such as in the top or left-hand margin, appear in the scanned image pages.

Figure 2:
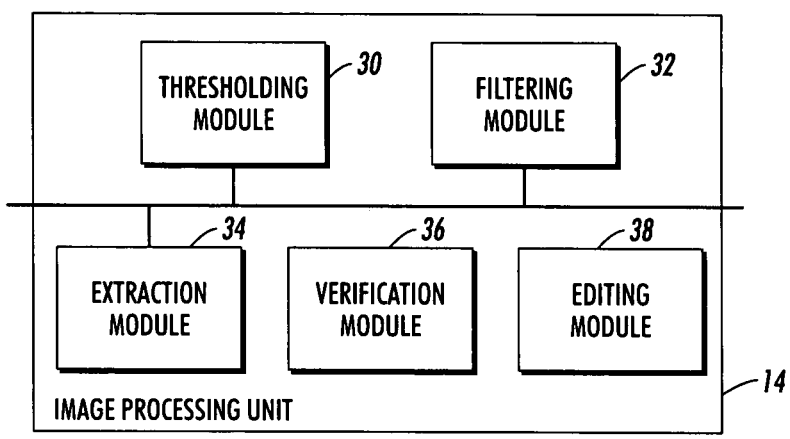
FIG. 2 is a functional block diagram of the image processing unit (IPU) of FIG. 1.

FIG. 2 illustrates the functional components of the IPU, which will be described in greater detail with respect to the exemplary method outlined below. The IPU 14 includes a thresholding module 30 for conversion of images which are not bitonal, e.g., those which have shades of gray or two or more colors, to a bitonal image. A filtering module 32 filters out small objects. An extraction module 34 extracts candidate punched holes. A verification module 36 performs tests on the candidate punched holes to eliminate other objects. An editing module 38 edits the original image to erase the remaining candidate punched hole artifacts. The modules may be in the form of software, hardware, or a combination thereof. As will be appreciated, the IPU may include modules for additional processing of the image not described herein.

Figure 3:
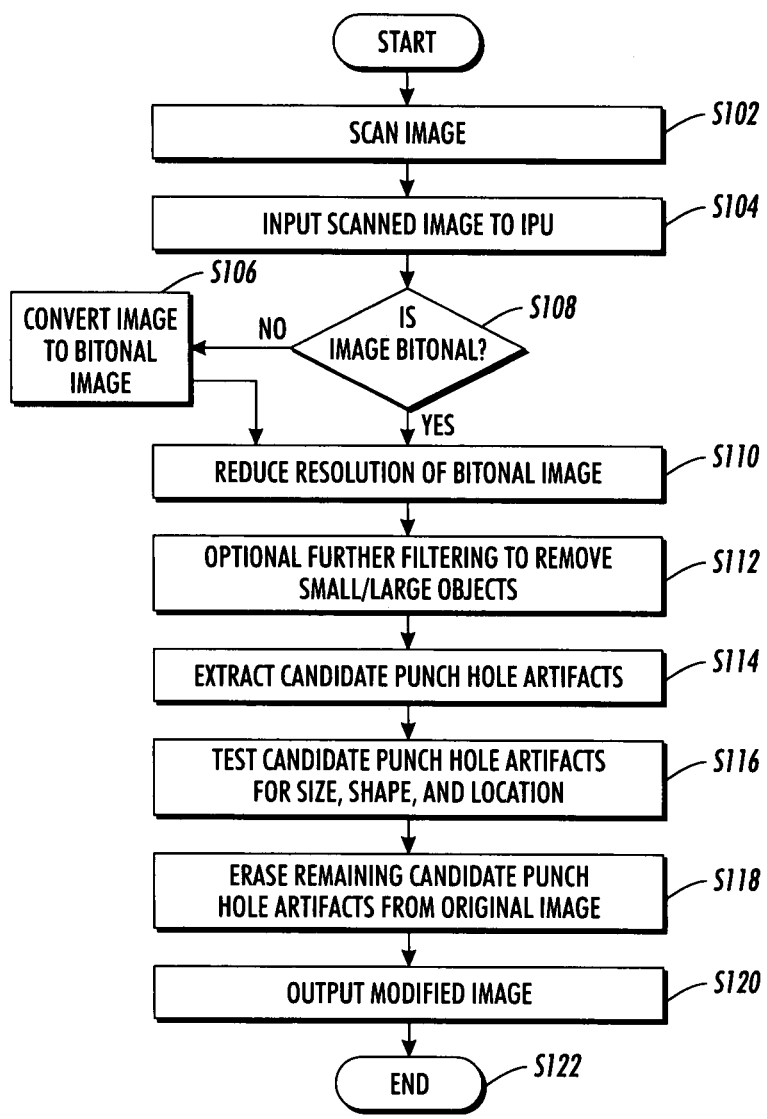
FIG. 3 is a flow diagram of a method for removal of artifacts arising from punched holes from scanned images in accordance with the exemplary embodiment.

FIG. 3 is a diagrammatic illustration of an artifact removal method for removal of punched hole artifacts ("black holes") from scanned images in accordance with the exemplary embodiment that can be implemented using the system of FIG. 1. It will be appreciated that the exemplary method may include fewer, more or different steps and that the steps need not proceed in the order illustrated.

The method begins at S100. At S102 a printed document page to be reproduced is scanned and original image data defining each pixel are derived. At S104, the original image data representing the scanned image is input to the IPU for processing. This step may proceed automatically or at the selection of a user, e.g., via the user input device 16, 24.

At S106, the image is examined to determine if it is bitonal. If the image is not bitonal, at S108, a bitonal image is generated. The bitonal image is generally a black and white image, although other bitonal images are contemplated. For convenience, those pixels in the bitonal image which are "on" (which typically includes those pixels of a punched hole artifact, where present) will be described herein as "black" and those pixels which are "off" will be described as "white."

At S110, a reduced resolution image is generated from the bitonal image. Since the punched holes are generally at least about 0.5 cm in size, information significantly smaller that a predetermined size, such as about 0.01 cm or about 0.1 cm can be assumed not to relate to a punched hole artifact and thus can be ignored. Also, processing a low resolution image can reduce processing time. Alternatively, the image may be reduced in resolution before making it bitonal.

At S112, further filtering may be performed to remove small and/or large objects from further consideration.

At S114, locations of candidate punched holes are identified.

At S116, one or more tests, such as checking for size, shape, and location, are performed to screen out other objects.

At S118 remaining candidate punched holes are removed from the original image. At S120, the modified original image may be output to an output device, such as to printer for printing or stored in memory. The method ends at S122.

Further details of the method will now be described with reference to specific embodiments.

To convert the image to a bitonal image (S108) the image may be threshholded (or another algorithm used). The bitonal image is generally a black and white image, although other bitonal images are contemplated. Thresholding refers to the process of determining whether a gray scale pixel should be converted to black or white. The results may be stored in a binary bitmap where each pixel is accorded a value of 1 or 0 depending on whether it is classified as black or white. This results in a binary bitmap or black map.

Figure 4:
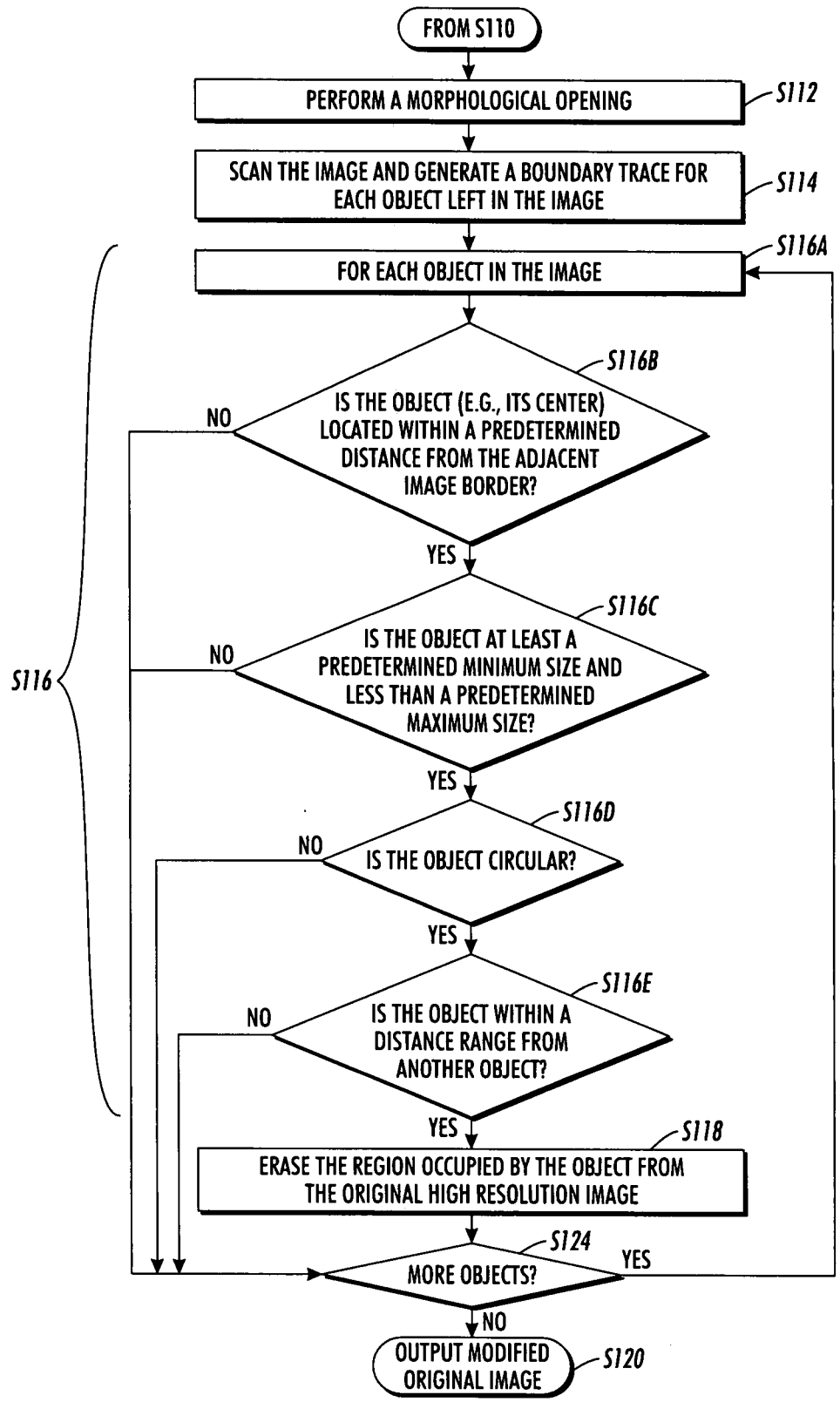
FIG. 4 is a flow diagram which illustrates part of the exemplary method of FIG. 3 in accordance with a first aspect of the exemplary embodiment.

In one embodiment, illustrated in FIG. 4, the reduced resolution image generated at S110 may be generated from the bitonal image by scaling the bitonal image to about 50 dots per inch (dpi) resolution with a nearest neighbor scaling. Other interpolations may alternatively be used which retain the bitonal nature. Scaling to 50 dpi leaves any punched hole artifacts approximately 10-15 pixels in diameter, which is sufficient for subsequently performed tests for circularity to be effective. However, other resolutions are also contemplated. In general the resolution may be selected such that a punched hole artifact, which in the original image has about a 0.5 cm diameter, has a diameter of about 30 pixels or less, and in general, 20 pixels or less. The reduction of resolution essentially performs a filtering of the image to remove small objects, since a pixel of the reduced resolution image will not be black unless the majority (or almost all) of the original image pixels from which it was generated were also black.

As illustrated in FIG. 4, at S112, a further filtering step may be performed in addition to S110. In S112, a morphological opening (an erode followed by a dilate) may be applied to the reduced resolution image generated at S110 to wipe out small objects. On a typical text document, this wipes out most text, and leaves only larger objects like graphics, pictures, and punched holes. Morphological opening generally operates by eroding the boundary of each object in the image by a selected number of pixels. For small objects, this may remove the object entirely, depending on how aggressively the morphological erosion is applied. For example, for an object which is 4×4 pixels, eroding the boundary by 2 pixels will remove the object entirely. Larger, non circular objects may be converted to a string of "islands," where only the larger regions remain. When the objects are dilated (typically by adding the same number of pixels around the boundary), only the larger objects are retained.

At S114 features of the remaining larger objects may be extracted, such as their location, size, and shape. In one embodiment, this includes identifying the boundary of an object, e.g., by chain code analysis. For example, the low resolution image is scanned using a chain code analysis to generate a boundary for each object still in the image. Chain codes operate by traversing the border of a region (here a region of black pixels) in a pre-defined direction and encoding the relationships of the locations pixels in the chain. This is typically more efficiently than independently storing the locations of each pixel forming the border of a region. In the exemplary embodiment, the boundary is defined for all objects remaining on the image after most objects have been removed in the morphological opening step. Alternatively, only a portion of the image is scanned (i.e., that portion around the perimeter of the image where punched holes are predicted to be located, if present). Although chain code is effective, other boundary detection algorithms can alternatively or additionally be applied.

As illustrated in FIG. 4, at S116, one or more tests are performed to screen out other remaining objects. At S116A a loop is commenced for each object in the image in which tests are performed to classify the objects as being a punched hole artifact or not. Some or all of the following tests may be performed.

At S116B tests may be performed for eliminating objects which fall outside a predetermined distance from an edge of the image from further consideration. For example, for each object detected in the image, a check is made as to whether the object is within 1.5 inches of the page border. The center of mass (the average x,y of the object border) may be used for the test, although other algorithms (such as bounding box) could be used. Any object not "near" an edge is ignored.

At S116C, tests are performed to determine whether the object size is within a range compatible with the object being a punched hole artifact. The object may be required to have at least a threshold size and be no more than a maximum size. The size may be determined in one direction or in two mutually perpendicular directions or computed as an average diameter for the object. For example, to be a punched hole artifact, the object may be required to be at least about 0.5 cm in diameter. For example, at a resolution of 50 dpi generated from a 300 dpi image, the object may be required to have a width between 10 and 25 pixels in the low resolution image, which is about 0.5 cm to about 1.3 cm. Of course, the supported size may be a configurable parameter.

At S116D, the object is tested for circularity. There are several algorithms for testing circularity of an object, including 1 Circularity: $P^2/A$ Where P=perimeter, A=Area, where a value of $4\pi$ indicates a circle.

2 Eccentricity (based on $2^{nd}$ order moments), where a value of 0 indicates a circle.

3 Standard deviation of the radius, where a value of 0 indicates a circle.

One or more of the tests for circularity may be employed. The test may be satisfied when the object falls within a predetermined variation about the true value for a circle. For example, the test for circularity may require the object to satisfy the expression: $3\pi \leq P^2/A \leq 5\pi$ to be considered circular. In general, the test for circularity may be deigned to capture objects which result from a hole being punched twice in closely spaced proximity such that the resulting artifact is somewhat oblate.

In other embodiments, the shape may be verified with a template which is the same size and shape as a typical black hole, at the reduced resolution.

Optionally, at S116E, another test which may be performed is to determine whether the distance between two candidate punched holes is within a predefined range which encompasses typical distances between punched holes. If there are more than two (or three) candidate punched holes, the candidates which best fit the required range may be retained. If this test is performed, the erasing step (S118) is not performed until all the remaining objects have been processed.

Further tests may be performed, such as the number of objects of a particular size within a margin of the image. Punched holes are usually found in a pair or at most, a triplet. Where there are fewer than two or more than four objects which meet the test, in a semi-automated method, an operator may be requested to review the image. In a fully automated method, a decision may be made automatically as to whether or not the objects should be removed. For example, the IPU may apply a rule which requires that if more than two objects are identified as candidate punched holes, none of the holes is removed.

If each of the tests performed at S116 are passed, the object is assumed to be a punched hole artifact and may be erased at S118. As will be appreciated, if one of the tests is not passed, the object may be eliminated from consideration without performing any further tests.

The loop continues to step S124 and is repeated for each object.

At S118 objects which meet the tests for a punched hole artifact are removed from the original high resolution image. Several methods for performing this step may be utilized. Some are more computationally expensive than others. One method may include computing an equivalent rectangle in the high resolution image that corresponds to the bounding box of the detected object (i.e., scaling up the pixel size and assigning pixel values to the four corners of the bounding box in the original image). The rectangle in the high resolution image is filled with a background color of the image, generally white. Another approach is to use a seed fill algorithm in the high resolution image to fill only the punched hole pixels with background color, e.g., white. This approach is more precise, but is more computationally expensive.

Figure 5:
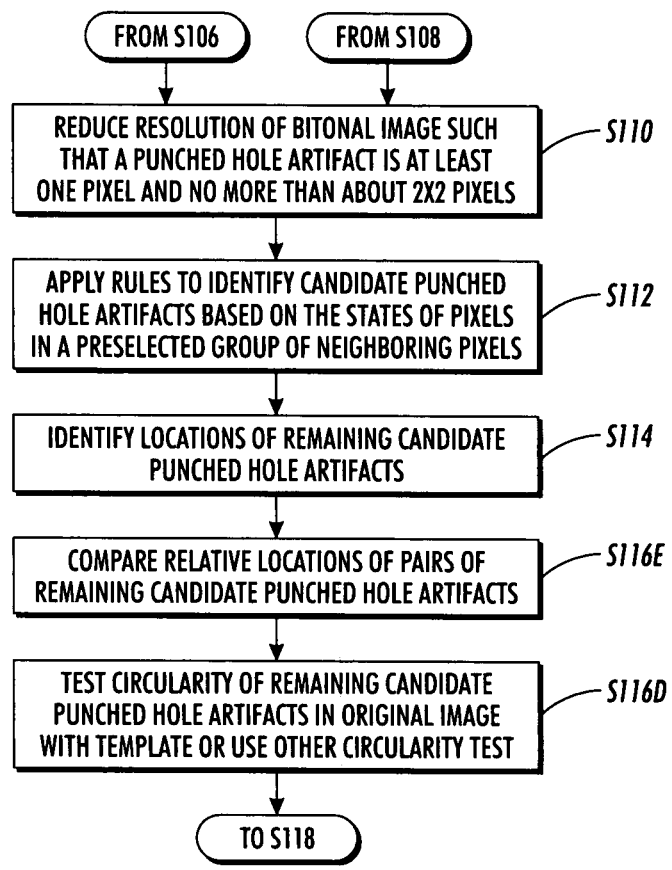
FIG. 5 is a flow diagram which illustrates part of the exemplary method of FIG. 3 in accordance with a second aspect of the exemplary embodiment.

In another embodiment, some of the steps may be performed as illustrated in FIG. 5. In this embodiment, the resolution of the bitonal image is reduced to the extent that punched hole artifacts are not lost, but are as small as possible, i.e., at least one pixel in size. Specifically, at S110, a pixel in the coarse black map is created from an N×N image block in the black map. It is black if and only if almost all the pixels in the blocks are black. N, the sub-sampling rate may be chosen such that the punched holes are reduced to 1×1, 1×2, 2×1, or 2×2 pixels in this reduced resolution image. Thus, for example, in a 300 dpi system where a hole punch is typically about 0.25 inches (0.635 cm) or about 75 pixels in diameter, the resolution may be reduced to about 10 dpi or less, e.g., about 6-8 dpi.

Figure 6:
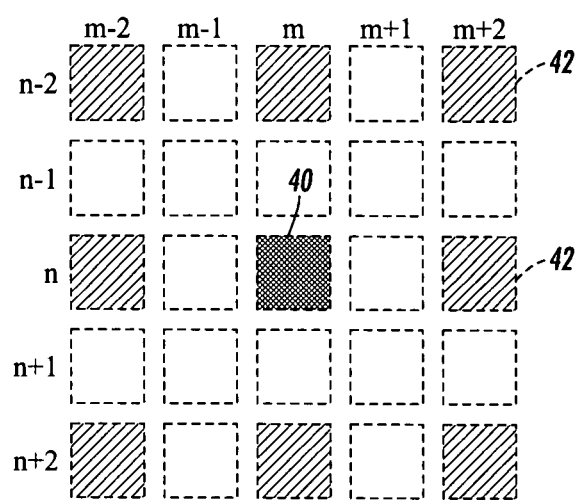
FIG. 6 illustrates a technique for identifying artifacts in a processed image.

In step S112, which may be performed instead of the morphological operation described for the embodiment of FIG. 4, the candidates for black punched holes are detected from the coarse black map derived at S110 by applying rules which specify, for a black pixel, the number/proportion of a predetermined group of neighboring pixels which are required to be black/non black. This procedure filters out objects which are substantially larger than a typical punched hole. In one embodiment, as illustrated in FIG. 6, a candidate must satisfy:

1 The current pixel 40 at location (m,n) is black;

2 At least five of its eight neighbors 42 at locations (m+2, n), (m+2, n+2), (m, n+2), (m−2, n+2), (m−2, n), (m−2, n−2), (m, n−2) and (m+2, n−2), are non-black.

These eight neighboring pixels 42 are in a ring of next nearest neighbors. They are all spaced either diagonally, horizontally, or vertically one pixel from the current pixel. In other embodiments, the other pixels in the ring of sixteen next to nearest neighbors and/or inner ring pixels can also or alternatively be considered and a predetermined number/proportion of these may also be required to be white. This step can be considered as a very coarse shape matching procedure. It filters out most text, pictures and other black objects that are not 1×1, 1×2, 2×1, or 2×2 in shape/size. For each black punched hole candidate, the IPU records its coordinates in a list.

In the FIG. 5 embodiment, at S116E, candidates are selected from the black punched hole candidate list to see if their relative positions/distances fit to those specified for the punched holes. Each time, M candidates are chosen, where M is the number of punched holes to be detected. If M is 2, the distance between the two candidates is measured. If the distance is close to the distance between the punched holes, the two candidates are recoded as a candidate group, to be further tested in the next step. For example, the two candidates must be at least a minimum distance apart and no more than a maximum distance apart. If not, the pair is eliminated and another two candidates selected, until all the combinations are exhausted. When M is 3, there are three distances between three candidates. The longest distance should be close to the distance between the top and bottom holes when generated by a conventional three hole punch, and the remaining two distances should be close to the distances between the middle hole and the top and bottom holes. The survivors of this step are the black objects pairs (or triplets) that are not only similar to the punched hole in size/shape, but also in relative distances.

In the embodiment of FIG. 5, a shape verification test (S116D) may be performed analogous to one or more of the circularity tests S116D of FIG. 4. Because resolution is too low in the reduced resolution image in this embodiment to check for circularity, the circularity test may be performed on the original (bitonal) image (or on a version of the image which contains enough shape information to identify circular objects, such as a resolution of about 50 dpi). The locations of the remaining candidate punched hole artifacts in the reduced resolution image can be used to identify the objects to be checked. In one embodiment, a template that represents the punched hole is applied to the bitonal image. The area of the candidate punched hole artifact must be predominantly congruent with the area of the template for the object to be retained as a punched hole artifact. In general this means that a) a minimum proportion of the pixels of the artifact fall within the area of the template and b) a minimum proportion of the pixels covered by the template comprise pixels of the artifact, for the object to be considered a punched hole artifact. Although this can be a relatively computationally expensive procedure, typically, only the true punched holes are tested in this step.

In general, the order in which the verification tests are performed at S116 may depend on how much computation is required as in general, the computation increases with the number of objects which remain as candidate punched hole artifacts. In the case of FIG. 5, for example, S116D is performed after S116E, although in other embodiments, a different order of the processing steps may be more appropriate.

Other steps of the method of FIG. 5 may be performed analogously to those described with reference to FIGS. 3 and 4.

The methods illustrated in FIGS. 2-5 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for removing scanned artifacts.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for removal of punched hole artifacts in digital images, comprising:
  for a scanned document page, deriving an original digital image that defines the page in terms of a plurality of input pixels;
  generating a reduced resolution bitonal image of black and white pixels from the original image, including reducing the resolution such that a punched hole artifact has a diameter of no more than two black pixels;
  providing for identifying of candidate punched hole artifacts in the reduced resolution bitonal image, including determining for a current pixel which is black, whether at least a predetermined proportion of a selected group of neighboring pixels is white and if so, identifying the pixel as a candidate punched hole artifact;
  providing for testing the candidate punched hole artifacts for at least one of shape, size, and location; and
  where a candidate punched hole artifact meets the at least one test, generating a modified image, including erasing the candidate punched hole artifact from the original digital image.

2. The method of claim 1, wherein where the original digital image is not bitonal, the method further comprises generating a bitonal image from the original image.

3. The method of claim 1, further comprising:
  performing a morphological opening on the reduced resolution image.

4. The method of claim 3, wherein the identification of candidate punched holes in the reduced resolution bitonal image includes identifying objects remaining after the morphological opening has been performed.

5. The method of claim 1, wherein the at least one test includes determining whether the candidate punched hole artifact is within a predetermined distance from an edge of the image.

6. The method of claim 1, wherein the at least one test includes determining whether the candidate punched hole artifact meets a test for circularity.

7. The method of claim 1, wherein the at least one test includes determining whether the candidate punched hole artifact falls predominantly within an area of a template for a punched hole artifact.

8. The method of claim 1, wherein the at least one test includes determining whether at least two candidate punched hole artifacts are spaced by a distance which falls within a predetermined range.

9. The method of claim 1, wherein the at least one test includes determining whether the candidate punched hole artifact has a size within a predetermined range.

10. The method of claim 1, wherein the at least one test includes a test for circularity, and wherein the circularity test is performed on the bitonal reduced resolution image.

11. The method of claim 1, further comprising scanning a document comprising a printed page.

12. The method of claim 1, further comprising outputting the modified digital image.

13. The method of claim 12, wherein the modified image is output to a printer and the method further comprises rendering the modified image on print media.

14. A computer program product comprising a non-transitory computer-readable recording medium encoding instructions, which when executed on a computer causes the computer to perform the method of claim 1.

15. An image processing unit which receives an input digital image and generates a bitonal reduced resolution image therefrom, the image processing unit being configured for identifying candidate punched hole artifacts in the bitonal reduced resolution image and for verifying whether an identified candidate punched hole artifact meets at least one test for a punched hole artifact, and where the candidate punched hole artifact meets the at least one test, automatically erasing the candidate punched hole artifact from the input digital image, the generating of the reduced resolution bitonal image including reducing the resolution such that a punched hole artifact has a diameter of no more than two black pixels, and the identifying of candidate punched hole artifacts in the reduced resolution bitonal image includes determining for a current pixel which is black, whether at least a predetermined proportion of a selected group of neighboring pixels is white.

16. The image processing unit of claim 15, further comprising a scanner which produces the input digital image.

17. The image processing unit of claim 15, further comprising a printer.

18. The method of claim 1, wherein the predetermined proportion is at least five of eight neighbors.

19. The method of claim 1, wherein the neighboring pixels are in a ring around the current pixel.

20. A method for removal of punched hole artifacts in digital images, comprising:
  for a scanned document page, deriving an original digital image that defines the page in terms of a plurality of input pixels;
  generating a reduced resolution bitonal image of black and white pixels from the original image;
  performing a morphological opening of an erode followed by a dilate on the reduced resolution bitonal image;
  providing for identifying of candidate punched hole artifacts in the reduced resolution bitonal image;
  providing for testing that there are at least two candidate punched holes and whether the distance between the at least two candidate punched holes is within a predefined range which encompasses a typical distance between punched holes, and testing at least one of shape, size, and location; and
  where the at least two candidate punched hole artifacts meet the at least one test, generating a modified image, including erasing the at least two candidate punched hole artifacts from the original digital image.

21. The method of claim 20, wherein generating the reduced resolution bitonal image reduces the resolution such that a punched hole artifact has a diameter of no more than two black pixels.

* * * * *